(12) United States Patent
Dave et al.

(10) Patent No.: US 8,506,854 B2
(45) Date of Patent: Aug. 13, 2013

(54) STABILIZER SYSTEM FOR HALOGENATED POLYMERS

(75) Inventors: Trupti Dave, Zwingenberg (DE); Wolfgang Wehner, Zwingenberg (DE)

(73) Assignee: Nabaltec AG, Schwandorf (DE)

( * ) Notice: Subject to any disclaimer, the term of this patent is extended or adjusted under 35 U.S.C. 154(b) by 691 days.

(21) Appl. No.: 12/672,894

(22) PCT Filed: Aug. 4, 2008

(86) PCT No.: PCT/EP2008/006412
§ 371 (c)(1),
(2), (4) Date: Feb. 9, 2010

(87) PCT Pub. No.: WO2009/021652
PCT Pub. Date: Feb. 19, 2009

(65) Prior Publication Data
US 2011/0129628 A1 Jun. 2, 2011

(30) Foreign Application Priority Data
Aug. 10, 2007 (DE) .......................... 10 2007 037 795

(51) Int. Cl.
| | |
|---|---|
| C09K 21/02 | (2006.01) |
| C09K 21/10 | (2006.01) |
| C09K 21/14 | (2006.01) |
| C09K 15/30 | (2006.01) |
| C09K 15/32 | (2006.01) |
| C08K 3/26 | (2006.01) |
| C08K 3/00 | (2006.01) |
| C08K 3/32 | (2006.01) |
| C01B 31/30 | (2006.01) |

(52) U.S. Cl.
USPC ...... 252/609; 252/602; 252/194; 252/400.52; 524/100; 524/101; 524/114; 524/437; 524/444; 423/420.2; 423/430; 521/145

(58) Field of Classification Search
USPC ......... 252/609, 602, 194, 400.52; 423/420.2, 423/430; 524/100, 101, 114, 437, 444; 521/145
See application file for complete search history.

(56) References Cited

U.S. PATENT DOCUMENTS

| | | | | | |
|---|---|---|---|---|---|
| 2,636,830 | A | * | 4/1953 | Wall | 106/464 |
| 6,084,013 | A | * | 7/2000 | Wehner | 524/100 |
| 7,741,390 | B2 | * | 6/2010 | Wehner et al. | 524/100 |
| 7,919,066 | B2 | * | 4/2011 | Sauerwein et al. | 423/420.2 |
| 2009/0101871 | A1 | * | 4/2009 | Fokken et al. | 252/400.61 |
| 2009/0105387 | A1 | * | 4/2009 | Wehner et al. | 524/425 |
| 2009/0131564 | A1 | * | 5/2009 | Wehner et al. | 524/100 |
| 2009/0292052 | A1 | * | 11/2009 | Sauerwein et al. | 524/425 |
| 2009/0306257 | A1 | * | 12/2009 | Wehner et al. | 524/100 |
| 2011/0129628 | A1 | * | 6/2011 | Dave et al. | 428/36.9 |
| 2011/0152430 | A1 | * | 6/2011 | Sauerwein et al. | 524/425 |

FOREIGN PATENT DOCUMENTS

| | | |
|---|---|---|
| DE | 102005031623.9 | 7/2005 |
| DE | 1020050312623.9 | 1/2007 |
| DE | 202006018816 U1 | 8/2007 |
| EP | 0734414 | 10/1996 |
| WO | WO 95/16739 | 6/1995 |
| WO | WO 2006/136191 A1 * | 12/2006 |
| WO | 2007003433 | 1/2007 |
| WO | WO 2007/003433 | 1/2007 |

OTHER PUBLICATIONS

Carlson et al. "Some Observations on the Calcium Aluminate Carbonate Hydrates", Journal of Research of the National Bureau of Standards, A. Physics and Chemistry, Vo. 64A. No. 4, Jul.-Aug. 1960, pp. 333-341.*
Renaudin et al., "Order and disorder in the lamellar hydrated tetracalcium monocarboaluminate compound", cement and Concrete Research vol. 29, 1999, pp. 63-69.*
Francois et al., "A Cementitious Compound with Composition", Acta Crystallographica Section C, vol. 54, Nr. 9, 1998, pp. 1214-1217.*

* cited by examiner

*Primary Examiner* — Joseph D Anthony
(74) *Attorney, Agent, or Firm* — Klauber & Jackson LLC

(57) ABSTRACT

The present invention relates to a stabilizer system for halogenated polymers comprising, as component (A), calcium monocarbonatohydroxodialuminate of the formula (A)

$$Ca_mAl_2(OH)_{6+2(m-1)}CO_3 \cdot nH_2O \qquad (A),$$

where m=from 3.8 to 4.2, and n=from 0 to 3, and,
as component (B), a catena-2,2',2"-nitrilotrisethanolperchloratolithium or -sodium coordination polymer (B1) with a monomer unit of the formula

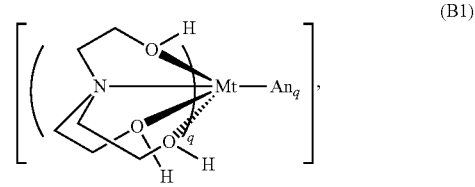

(B1)

where Mt=Li or Na, An=$OClO_3$ and q=1, and/or a quaternary or ternary ammonium or phosphonium perchlorate (B2).
The present invention further relates to compositions and articles comprising these stabilizer systems, and to the use of the systems and compositions.

16 Claims, No Drawings

STABILIZER SYSTEM FOR HALOGENATED POLYMERS

CROSS REFERENCE TO RELATED APPLICATIONS

The present application is a National Stage Application claiming the priority of co-pending PCT Application No. PCT/EP2008/006412 filed Aug. 4, 2008, which in turn, claims priority from German Application Serial No. 10 2007 037 795.0 filed Aug. 10, 2007. Applicants claim the benefits of 35 U.S.C. §120 as to the PCT application and priority under 35 U.S.C. §119 as to the said German application, and the entire disclosures of both applications are incorporated herein by reference in their entireties.

The present invention relates to stabilizer systems for halogen-containing polymers, and also to compositions and articles comprising the stabilizer systems, and to the use of the systems and compositions.

It is known that halogen-containing plastics have a tendency toward undesired decomposition reactions and undesired degradation reactions when they are subjected to thermal stress during processing or in long-term use. This problem can be solved by using metal-containing stabilizers, these being added to the halogen-containing polymers prior to or during processing. Among the known stabilizers are barium-cadmium stabilizers, lead stabilizers, organotin stabilizers, barium-zinc stabilizers, and calcium-zinc stabilizers. All of these groups of stabilizers contain heavy metals, however, and this impairs their environmental compatibility.

Recent years have therefore seen increasing development of systems known as organic systems, which are free from heavy metals, and these are also now available in the market. They are solid stabilizers and are mostly handled in a compacted, more environmentally friendly, form. These organically based systems are multicomponent mixtures, the main component of which is mostly a member of the hydrotalcites group of substances (magnesium aluminum hydroxycarbonates).

However, this class of compound is relatively expensive to produce because of the raw materials involved. The production process is moreover attended by a considerable amount of wastewater, because of the magnesium salts and aluminum salts that have to be used.

Heavy-metal-free compositions which function as heat stabilizers for PVC, comprising hydrotalcite and, respectively, hydrocalumite (katoite) are described by way of example in EP 1 046 668 B1 and EP 0930 332 B1.

It therefore remains necessary to search for substances which are less expensive and which can moreover be synthesized in an environmentally compatible manner, without excessive use of resources.

The prices of raw materials for calcium monocarbonatohydroxodialuminates make them an attractive heat stabilizer for PVC. However, they are very expensive to produce industrially. The German patent application with application number DE 10 2006 055214.8 describes a process for producing this class of compound. This process can give environmentally friendly production at low cost, since it uses low-cost raw materials and the amounts of wastewater arising are only small.

Triethanolamine-metal inner complexes in the form of coordination polymers have moreover been disclosed by WO-A 2006/0136191, as additives for synthetic polymers.

Despite the stabilizer systems available, there is a requirement for alternative systems which can have improved stabilizer properties, and also the abovementioned advantages.

It is therefore an object of the present invention to provide these stabilizer systems.

The object is achieved via a stabilizer system for halogen-containing polymers, comprising, as component (A), calcium monocarbonatohydroxodialuminate of the formula (A)

$$Ca_mAl_2(OH)_{6+2(m-1)}CO_3 \cdot nH_2O \qquad (A),$$

where m=from 3.8 to 4.2, and n=from 0 to 3, and,
as component (B), a catena-2,2',2''-nitrilotrisethanolperchloratolithium or -sodium coordination polymer (B1) having a monomer unit of the formula

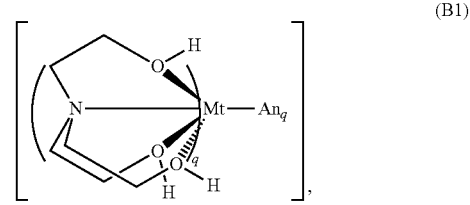

(B1)

where Mt=Li or Na, An=OClO$_3$, and q=1, and/or a quaternary or ternary ammonium or phosphonium perchlorate (B2).

Specifically, it has been found that combinations of components (A) and (B) lead to an increase in heat-stabilizer action in particular in PVC. A still further increase is obtained by adding components (C).

Component (A) is calcium monocarbonatohydroxodialuminate of the formula (A). Production of this compound has been described by way of example in the German patent application with application number DE 10 2006 055214.8.

Component (B) comprises compounds (B1) and/or (B2).

The compounds (B1) are coordination polymers, and contain the following monomer unit:

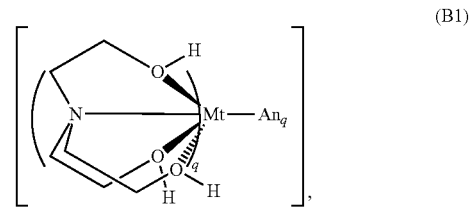

(B1)

where Mt=Li or Na, An=OClO$_3$, and q=1.

WO-A 2006/0136191 describes these per se, and also describes their production.

The compounds (B2) are quaternary or ternary ammonium and, respectively, phosphonium perchlorates.

These are preferably perchlorates of the formula $R^1R^2_3XClO_4$, where X is P or N, $R^1$ is H or $R^2$, and each $R^2$, independently of the other, is a saturated or unsaturated, branched or unbranched cyclic or acyclic, or both cyclic and acyclic, hydrocarbon radical having from 1 to 20 carbon atoms.

These quaternary salts are obtainable via anion metathesis of alkali-metal perchlorates (mostly the sodium compound) with quaternary ammonium or phosphonium salts (mostly halides or nitrates) in water, where the quaternary onium perchlorates are produced in the form of filterable precipitates. The ternary onium perchlorates are produced by protonating the tertiary amines or phosphanes with aqueous perchloric acid.

The proportion of component (B), based on component (A), is preferably from 1 to 10% by weight.

The stabilizer system of the invention can moreover also comprise components (C), these being nitrogen-containing organic compounds or calcium hydroxide.

It is preferable here that component (C) comprises nitrogen-containing organic compounds (C) which are substituted cyanoacetylureas (C-1), substituted 6-aminouracils (C-2, C-3, C-4, C-5, and C-6), substituted mono- or poly-1,4-dihydropyridines (C-7), and 3-aminocrotonic esters (C-8), and which have the following structures:

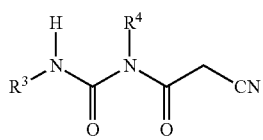
(C-1)

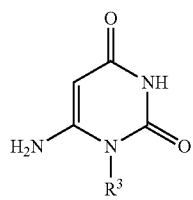
(C-2)

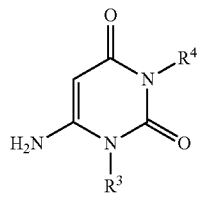
(C-3)

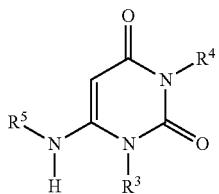
(C-4)

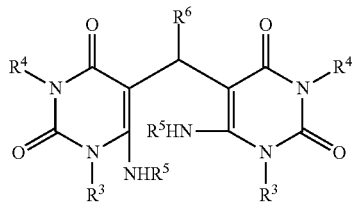
(C-5)

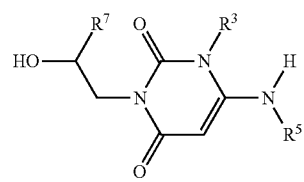
(C-6)

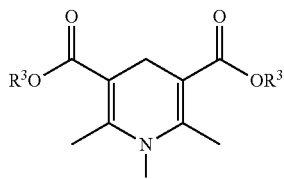
(C-7)

or poly-1,4-dihydropyridine*

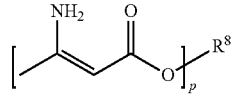
(C-8)

* = The structure of the substituted poly-1,4-dihydropyridines is described in WO2006/0136191.

in which $R^3 = C_1$-$C_{20}$-alkyl, $C_3$-$C_6$-alkenyl, $C_7$-$C_9$-phenylalkyl, unsubstituted phenyl, or phenyl substituted with from 1 to 3 $C_1$-$C_4$-alkyl, $C_1$-$C_4$-alkoxy, or hydroxy groups, and $R^4 = R^3$ or H.

$R^5 =$ H or hydroxy-$C_2$-$C_4$-alkyl, hydroxyphenyl, $C_1$-$C_4$-alkoxyphenyl, $R^6 = C_1$-$C_{20}$-alkyl, $R^7 =$ H, or the following radicals: $C_1$-$C_{14}$-alkyl, $C_2$-$C_4$-alkenyl, $C_4$-$C_8$-optionally substituted cycloalkyl, $C_6$-$C_{10}$-aryl, $C_7$-$C_{10}$-alkaryl, $C_7$-$C_{10}$-aralkyl, —$CH_2$—O—$R^9$, where $R^9 = C_1$-$C_{10}$-alkyl radical or $C_2$-$C_4$-alkenyl radical, or $C_4$-$C_8$-cycloalkyl, if appropriate comprising an oxirane ring.

$R^8 =$ unbranched or branched $C_2$-$C_{20}$-alkylene, which can have interruption by from 1 to 4 O or S atoms or/and can have substitution by from 1 to 4 OH groups, or dimethylolcyclohexane-1,4-diyl, polyethylene- (or -propylene)glycol-$\alpha,\omega$-diyl(poly preferably being tetra to deca), polyglyceryl-$\alpha,\omega$-diyl(poly preferably being tetra to deca) or glyceroltriyl, trimethylolethane- (or -propane)triyl, pentaerythritol-tri(or -tetra)yl, bistrimethylolethane-(or -propane)tri(or -tetra)yl, diglyceroltri(or -tetra)yl, tetritol-tetrayl, triglyceroltri(or -tetra or -penta)yl, pentitol-pentayl, dipentaerythritol-penta (or -hexa)yl, and hexitol-hexayl; and p=from 2 to 6.

It is particularly preferable that the substituted cyanoacetylurea is 1,3-dimethylcyanoacetylurea, that the substituted 6-aminouracil is 1,3-dimethyl-6-aminouracil, 1,3-diallyl-6-aminouracil, or a 5,5'-[$C_4$-$C_{18}$-alkylidene]-bis-1,3-dimethyl-6-aminouracil, the substituted 1,4-dihydropyridine is 2,6-dimethyl-3,5-biscarboxylauryl-1,4-dihydropyridine, and the 3-aminocrotonic ester is 1,4-butanediylbis-3-aminocrotonate or 2,2'-thiobisethanediyl 3-aminocrotonate.

Substance classes (C-1) to (C-6) are described in more detail in EP 0768 336, EP 1 510 545, EP 0 967 209, EP 0 967 208, EP 0 962 491, and EP 1 044 968.

Particular preference is given to the following compounds as components (A) to (C).

(A): tetracalcium monocarbonatododecahydroxodialuminate, and also hydrates thereof (B): catena-2,2',2"-nitrilotrisethanolperchloratosodium (C): (C-1) 1,3-dimethylcyanoacetylurea (C-2) 1-[$C_3$-$C_{22}$-alkyl]- or 1-benzyl-6-aminouracil (C-3) bis-1,3-$C_1$-$C_{22}$-alkyl- or 1,3-dibenzyl-6-aminouracil (C-4) 6-[2-hydroxyethylamino]-, 6-[2(3,4)-hydroxyanilino]-, or 6-[2(3,4)-meth(eth)oxyanilino]-1,3-dimethyluracil (C-5) 5,5'-[C$_4$-C$_{18}$-alkylidene]bis-1,3-dimethyl-6-aminouracil (C-6) 1-methyl(phenyl, benzyl)-3-[2-hydroxybutyl]-6-aminouracil, or 1-methyl(phenyl, benzyl)-3-[2-hydroxy-2-allyloxyethyl]-6-aminouracil (C-7) 2,6-dimethyl-3,5-biscarboxylauryl-1,4-dihydropyridine (C-8) 1,4-butanediylbis-3-aminocrotonate, or 2,2'-thiobisethanediyl 3-aminocrotonate.

Among (C), very particular preference is given to:
1,3-dimethyl-6-aminouracil, 1,3-dibenzyl-6-aminouracil (C-3),
1,3-dimethyl-6-[2-hydroxyanilino]uracil (C-4),
5,5'-pentylidenebis-1,3-dimethyl-6-aminouracil,
5,5'-hexylidenebis-1,3-dimethyl-6-aminouracil,
5,5'-heptylidenebis-1,3-dimethyl-6-aminouracil,
5,5'-octylidenebis-1,3-dimethyl-6-aminouracil,
5,5'-undecylidenebis-1,3-dimethyl-6-aminouracil, or
5,5'-dodecylidenebis-1,3-dimethyl-6-aminouracil (C-5),
1-methyl-3-[2-hydroxybutyl]-6-aminouracil, or
1-benzyl-3-[2-hydroxybutyl]-6-aminouracil (C-6),
2,6-dimethyl-3,5-biscarboxylauryl-1,4-dihydropyridine (C-7)
and
1,4-butanediyl bisaminocrotonate, or
2,2'-thiodiethanoldiyl bisaminocrotonate (C-8),
calcium hydroxide.

The stabilizer system of the invention can, if appropriate, also comprise further additives, such as:
- magnesium hydroxide and alkaline-earth-metal soaps
- polyols and sugar alcohols, or trishydroxyalkyl isocyanurates
- phosphorous esters (phosphites)
- glycidyl compounds and epoxidized fatty acid esters
- sterically hindered amines (HALS) and aminoalcohols
- β-diketones and β-keto esters
- antioxidants
- UV absorbers and light stabilizers
- optical brighteners
- antistatic agents
- biocides
- pigments
- fillers
- blowing agents
- lubricants
- plasticizers The present invention therefore further provides a composition of the invention which also comprises one or more of these compounds.

It is preferable that the stabilizer system of the invention also comprises at least one antioxidant and/or one alcohol selected from polyols, sugar alcohols, and trishydroxyalkyl isocyanurates or aminoalcohols.

Alkaline-Earth-Metal Hydroxides and Alkaline-Earth-Metal Soaps

Preference is given to calcium hydroxide and calcium stearate.

Polyols and Sugar Alcohols

Examples of compounds of this type that can be used are: pentaerythritol, dipentaerythritol, tripentaerythritol, trimethylolethane, bistrimethylolpropane, inositol, polyvinyl alcohol, bistrimethylolethane, trimethylolpropane, sorbitol, maltitol, isomaltitol, Lycasin, mannitol, lactose, leucrose, tris(hydroxyethyl) isocyanurate (THEIC), palatinitol, tetramethylcyclohexanol, tetramethylolcyclopentanol, tetramethylolpyranol, glycerol, diglycerol, polyglycerol, thiodiglycerol, or 1-O-∞-D-glycopyranosyl-D-mannitol dihydrate. Preference is given to disaccharide alcohols. Polyol syrups are also used, examples being sorbitol syrup, mannitol syrup, and maltitol syrup. An example of the amount that can be used of the polyols is from 0.01 to 20 parts by weight, usefully from 0.1 to 20 parts by weight, and in particular from 0.1 to 10 parts by weight, based on 100 parts by weight of PVC. Tris(hydroxyethyl)isocyanurate is preferred.

Phosphorous Esters (Phosphites)

Examples of these are trioctyl, tridecyl, tridodecyl, tritridecyl, tripentadecyl, trioleyl, tristearyl, triphenyl, trilauryl, tricresyl, trisnonylphenyl, tris-2,4-tert-butylphenyl, or tricyclohexyl phosphite. Other suitable phosphites are various mixtures of aryl dialkyl or alkyl diaryl phosphites, e.g. phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl, and dodecyl bis-2,4-di-tert-butylphenyl phosphite. It is also advantageously possible to use phosphites of various di- or polyols, e.g. tetraphenyl dipropylene glycol diphosphite, poly(dipropylene glycol) phenyl phosphite, tetraisodecyl dipropylene glycol diphosphite, trisdipropylene glycol phosphite, tetramethylolcyclohexanol decyl diphosphite, tetramethylolcyclohexanol butoxyethoxyethyl diphosphite, tetramethylolcyclohexanol nonylphenyl diphosphite, bisnonylphenylditrimethylolpropane diphosphite, bis-2-butoxyethylditrimethylolpropane diphosphite, trishydroxyethyl isocyanurate hexadecyl triphosphite, didecyl pentaerythritol diphosphite, distearyl pentaerythritol diphosphite, bis-2,4-di-tert-butylphenyl pentaerythritol diphosphite, and also mixtures of these phosphites, and aryl/alkyl phosphite mixtures of statistical composition $(H_{19}C_9$—$C_6H_4)O_{1.5}P(OC_{12,13}H_{25,27})_{1.5}$, or $(C_8H_{17}$—$C_6H_4$—$O$—$)_2P$ (iso-$C_8H_{17}$O), $(H_{19}C_9$—$C_6H_4)O_{1.5}P(OC_{9,11}H_{19,23})_{1.5}$. Industrial examples are Naugard P, Mark CH300, Mark CH301, Mark CH302, and Mark CH55 (producer: Chemtura Corp. USA). An example of an amount that can be used of the organic phosphites is from 0.01 to 10 parts by weight, usefully from 0.05 to 5 parts by weight, and in particular from 0.1 to 3 parts by weight, based on 100 parts by weight of PVC.

A stabilizer system of the invention can comprise an amount of up to about 30% by weight, in particular up to about 10% by weight, of the phosphite compounds described.

Glycidyl Compounds and Epoxidized Fatty Acid Esters

Examples of epoxy compounds are epoxidized soy oil, epoxidized olive oil, epoxidized linseed oil, epoxidized castor oil, epoxidized peanut oil, epoxidized maize oil, and epoxidized cottonseed oil.

Examples of glycidyl compounds are compounds having the glycidyl group:

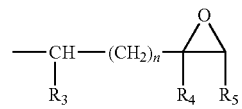

which can have direct bonding to carbon atoms, to oxygen atoms, to nitrogen atoms, or to sulfur atoms, and in which either both of $R_3$ and $R_5$ are hydrogen, $R_4$ is hydrogen or methyl, and n=0, or in which $R_3$ and $R_5$ together are —$CH_2$—$CH_2$— or —$CH_2$—$CH_2$—$CH_2$—, and $R_4$ is then hydrogen, and n=0 or 1.

I) Glycidyl and β-methylglycidyl esters obtainable via reaction of a compound having at least one carboxy group in the molecule and epichlorohydrin and, respectively, glycerol dichlorohydrin and, respectively, β-methylepichlorohydrin. The reaction is usefully carried out in the presence of bases.

Compounds that can be used that have at least one carboxy group in the molecule are aliphatic carboxylic acids. Examples of these carboxylic acids are glutaric acid, adipic acid, pimelic acid, suberic acid, azelaic acid, sebacic acid, or dimerized or trimerized linoleic acid, acrylic and methacrylic acid, caproic acid, caprylic acid, pelargonic acid, lauric acid, myristic acid, palmitic acid, and stearic acid.

However, it is also possible to use cycloaliphatic carboxylic acids, e.g. cyclohexanecarboxylic acid, tetrahydrophthalic acid, 4-methyltetrahydrophthalic acid, hexahydrophthalic acid, or 4-methylhexahydrophthalic acid.

Aromatic carboxylic acids can also be used, examples being benzoic acid, phthalic acid, isophthalic acid, trimellitic acid, or pyromellitic acid.

It is also possible to use carboxy-terminated adducts, e.g. of trimellitic acid and of polyols, such as glycerol or 2,2-bis (4-hydroxycyclohexyl)propane.

EP 0 506 617 reveals further epoxy compounds that can be used for the purposes of this invention.

II) Glycidyl or β-methylglycidyl ethers obtainable via reaction of a compound having at least one free alcoholic hydroxy group and/or phenolic hydroxy group with a suitably substituted epichlorohydrin under alkaline conditions, or in the presence of an acidic catalyst with subsequent alkali treatment.

Ethers of this type derive by way of example from acyclic alcohols, such as ethylene glycol, diethylene glycol, and higher poly(oxyethylene)glycols, propane-1,2-diol, or poly (oxypropylene)glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, or sorbitol, or else from polyepichlorohydrins, butanol, amyl alcohol, or pentanol, or else from monohydric alcohols, such as isooctanol, 2-ethylhexanol, or isodecanol, or else from $C_7$-$C_9$-alkanol mixtures and $C_9$-$C_{11}$-alkanol mixtures.

However, they also derive by way of example from cycloaliphatic alcohols, such as 1,3- or 1,4-dihydroxycyclohexane, bis(4-hydroxycyclohexyl)methane, 2,2-bis(4-hydroxycyclohexyl)propane, or 1,1-bis(hydroxymethyl)cyclohex-3-ene, or they can have aromatic rings, examples being N,N-bis(2-hydroxyethyl)aniline, or p,p'-bis(2-hydroxyethylamino)diphenylmethane.

The epoxy compounds can also derive from mononuclear phenols, for example from phenol, resorcinol, or hydroquinone; or they can be based on polynuclear phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone, or condensates obtained under acidic conditions from phenols with formaldehyde, e.g. phenol novolacs.

Examples of other possible terminal epoxides are: glycidyl 1-naphthyl ether, glycidyl 2-phenylphenyl ether, 2-biphenyl glycidyl ether, N-(2,3-epoxypropyl)phthalimide, and 2,3-epoxypropyl 4-methoxyphenyl ether.

III) N-Glycidyl compounds attainable via dehydrochlorination of the reaction products of epichlorohydrin with amines containing at least one amino hydrogen atom. Examples of these amines are aniline, N-methylaniline, toluidine, n-butylamine, bis(4-aminophenyl)methane, m-xylylenediamine, and bis(4-methylaminophenyl)methane, and also N,N,O-triglycidyl-m-aminophenol and N,N,O-triglycidyl-p-aminophenol.

However, among the N-glycidyl compounds are also N,N'-di-, N,N',N"-tri-, and N,N',N",N"'-tetraglycidyl derivatives of cycloalkyleneureas, such as ethyleneurea or 1,3-propyleneurea, and N,N'-diglycidyl derivatives of hydantoins, e.g. of 5,5-dimethylhydantoin or glycoluril and triglycidyl isocyanurate.

IV) S-Glycidyl compounds, such as di-S-glycidyl derivatives, where these derive from dithiols, such as ethane-1,2-dithiol, or bis(4-mercaptomethylphenyl)ether.

V) Epoxy compounds having a radical of the above formula in which $R_1$ and $R_3$ together are —$CH_2$—$CH_2$— and n is 0 are bis(2,3-epoxycyclopentyl)ether, 2,3-epoxycyclopentyl glycidyl ether, or 1,2-bis(2,3-epoxycyclopentyloxy) ethane. An example of an epoxy resin having a radical of the above formula in which $R_1$ and $R_3$ together are —$CH_2$—$CH_2$— and n is 1 is 3',4'-epoxy-6'-methylcyclohexylmethyl 3,4-epoxy-6-methylcyclohexanecarboxylate.

Examples of suitable terminal epoxides are:

a) liquid bisphenol A diglycidyl ethers, such as Araldit®GY 240, Araldit®GY 250, Araldit®GY 260, Araldit®GY 266, Araldit®GY 2600, Araldit®MY 790, and Epicote® 828 (BADGE);

b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610, and Epikote® 1002;

c) liquid bisphenol F diglycidyl ethers, such as Araldit®GY 281, Araldit®PY 302, Araldit®PY 306 (BFDGE);

d) solid polyglycidyl ethers of tetraphenylethane, such as CG Epoxy Resin®0163;

e) solid and liquid polyglycidyl ethers of phenol-formaldehyde novolac, such as EPN 1138, EPN 1139, GY 1180, PY 307 (NODGE);

f) solid and liquid polyglycidyl ethers of o-cresol-formaldehyde novolac, such as ECN 1235, ECN 1273, ECN 1280, ECN 1299 (NODGE);

g) liquid glycidyl ethers of alcohols, such as Shell Glycidylether® 162, Araldit®DY 0390, Araldit®DY 0391;

h) liquid and solid glycidyl esters of carboxylic acids, examples being Shell Cardura® E terephthalic esters, trimellitic esters, and also mixtures of these, Araldit®PY 284 and Araldit® P811 i) solid heterocyclic epoxy resins (triglycidyl isocyanurate), such as Araldit® PT 810;

j) liquid cycloaliphatic epoxy resins, such as Araldit®CY 179;

k) liquid N,N,O-triglycidyl ethers of p-aminophenol, such as Araldit®MY 0510;

l) tetraglycidyl-4-4'-methylenebenzamine or N,N,N',N'-tetraglycidyldiaminophenylmethane, such as Araldit®MY 720, Araldit®MY 721.

It is preferable to use epoxy compounds having two functional groups. However, it is also possible in principle to use epoxy compounds having one, or three or more functional groups.

Compounds mainly used are epoxy compounds, especially diglycidyl compounds, having aromatic groups.

It is also possible, if appropriate, to use a mixture of various epoxy compounds.

Sterically Hindered Amines (HALS) and Aminoalcohols

The sterically hindered amines are generally compounds containing the following group

in which A and V, independently of one another, are $C_1$-$C_8$-alkyl, $C_3$-$C_8$-alkenyl, $C_5$-$C_8$-cycloalkyl, or $C_7$-$C_9$-phenylalkyl, or together, if appropriate, form $C_2$-$C_5$-alkylene, if appropriate having interruption by 0, by NH, or by $CH_3$—N, or the sterically hindered amine may be cyclic, in particular a compound from the class of the alkyl- or polyalkylpiperidines, especially of the tetramethylpiperidines containing the following group

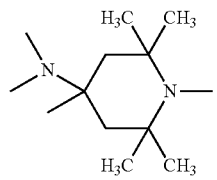

Examples of these polyalkylpiperidine compounds are as follows (where, in the case of the oligomeric or polymeric compounds, n and r are in the range from 2 to 200, preferably in the range from 2 to 10, in particular from 3 to 7). A comprehensive list of these compounds is found in EP 0 796 888 B1.

For the purposes of one particularly preferred embodiment of the present invention, the aminoalcohols used comprise heterocyclic compounds. Examples of these are: EO-, PO-, and BO-reaction products of ethylene- and propyleneureas, of parabanic acid, of hydantoins, of barbituric acids, of glycolurils, and of isocyanuric acids. For the purposes of the present invention, it is particularly preferable to use tris(hydroxyethyl)isocyanurate (THEIC) or tris(hydroxypropyl)isocyanurate as constituent of the stabilizer system of the invention.

The THEIC content of a stabilizer system of the invention is by way of example from about 0.01 to about 10% by weight.

β-Diketones and β-Keto Esters 1,3-Dicarbonyl compounds that can be used are linear or cyclic dicarbonyl compounds. It is preferable to use dicarbonyl compounds of the formula $R'_1CO\ CHR'_2$—$COR'_3$, in which $R'_1$ is $C_1$-$C_{22}$-alkyl, $C_5$-$C_{10}$-hydroxyalkyl, $C_2$-$C_{18}$-alkenyl, or phenyl, or phenyl substituted by OH, by $C_1$-$C_4$-alkyl, by $C_1$-$C_4$-alkoxy, or by halogen, or is $C_7$-$C_{10}$-phenylalkyl or $C_5$-$C_{12}$-cycloalkyl, or $C_1$-$C_4$-alkyl-substituted $C_5$-$C_{12}$-cycloalkyl, or a —$R'_5$—S—$R'_6$ or —$R'_5$—O—$R'_6$ group; $R'_2$ is hydrogen, $C_1$-$C_8$-alkyl, $C_2$-$C_{12}$-alkenyl, phenyl, $C_7$-$C_{12}$-alkylphenyl, $C_7$-$C_{10}$-phenylalkyl, or a —CO—$R'_4$ group; $R'_3$ is defined as for $R'_1$ or is $C_1$-$C_{18}$-alkoxy, $R'_4$ is $C_1$-$C_4$-alkyl or phenyl; $R'_5$ is $C_1$-$C_{10}$-alkylene, and $R'_6$ is $C_1$-$C_{12}$-alkyl, phenyl, $C_7$-$C_{18}$-alkylphenyl, or $C_7$-$C_{10}$-phenylalkyl.

Among these compounds are the diketones containing hydroxy groups in the patent EP 0.346.279 A1, and the oxa and thia diketones in the patent EP 0.307.358 A1, and also the isocyanuric-acid-based keto esters in the U.S. Pat. No. 4,339,383.

$R'_1$ and $R'_3$ as alkyl can in particular be $C_1$-$C_{18}$-alkyl, e.g. methyl, ethyl, n-propyl, isopropyl, n-butyl, tert-butyl, pentyl, hexyl, heptyl, octyl, decyl, dodecyl, or octadecyl.

$R'_1$ and $R'_3$ as hydroxyalkyl are in particular a —$(CH_2)_n$—OH group, in which n is 5, 6, or 7.

$R'_1$ and $R'_2$ as alkenyl can by way of example be vinyl, allyl, methallyl, 1-butenyl, 1-hexenyl, or oleyl, preferably allyl.

$R'_1$ and $R'_3$ as OH-, alkyl-, alkoxy-, or halogen-substituted phenyl can by way of example be tolyl, xylyl, tert-butylphenyl, methoxyphenyl, ethoxyphenyl, hydroxyphenyl, chlorophenyl, or dichlorophenyl.

$R'_1$ and $R'_3$ as phenylalkyl are in particular benzyl. $R'_2$ and $R'_3$ as cycloalkyl or alkylcycloalkyl are in particular cyclohexyl or methylcyclohexyl.

$R'_2$ as alkyl can in particular be $C_1$-$C_4$-alkyl. $R'_2$ as $C_2$-$C_{12}$-alkenyl can in particular be allyl. $R'_2$ as alkylphenyl can in particular be tolyl. $R'_2$ as phenylalkyl can in particular be benzyl. It is preferable that $R'_2$ is hydrogen. $R'_3$ as alkoxy can by way of example be methoxy, ethoxy, butoxy, hexyloxy, octyloxy, dodecyloxy, tridecyloxy, tetradecyloxy, or octadecyloxy. $R'_5$ as $C_1$-$C_{10}$-alkylene is in particular $C_2$-$C_4$-alkylene. $R'_6$ as alkyl is in particular $C_4$-$C_{12}$-alkyl, e.g. butyl, hexyl, octyl, decyl, or dodecyl.

$R'_6$ as alkylphenyl is in particular tolyl. $R'_6$ as phenylalkyl is in particular benzyl.

Examples of 1,3-dicarbonyl compounds of the above general formula, and also alkali-metal chelates, alkaline-earth-metal chelates, and zinc chelates thereof are acetylacetone, butanoylacetone, heptanoylacetone, stearoylacetone, palmitoylacetone, lauroylacetone, 7-tertnonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl)methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, biscyclohexanoylmethane, dipivaloylmethane, 2-acetylcyclopentanone, 2-benzoylcyclopentanone, the methyl, ethyl, and allyl esters of diacetoacetic acid, the methyl and ethyl esters of benzoyl-, propionyl-, and butyrylacetoacetic acid, triacetylmethane, the methyl, ethyl, hexyl, octyl, dodecyl, or octadecyl ester of acetoacetic acid, the methyl, ethyl, butyl, 2-ethylhexyl, dodecyl, or octadecyl ester of benzoylacetic acid, and also $C_1$-$C_{18}$-alkyl esters of propionyl- and butyrylacetic acid. The ethyl, propyl, butyl, hexyl, or octyl ester of stearoylacetic acid, and also the polynuclear β-keto esters described in the patent EP-A 0 433 230, and dehydroacetic acid, and also the zinc, magnesium, or alkali metal salts thereof. Preference is given to the Ca, Mg, and Zn salts of acetylacetone and of dehydroacetic acid.

Particular preference is given to 1,3-diketo compounds of the above formula in which $R'_1$ is $C_1$-$C_{18}$-alkyl, phenyl, or phenyl substituted by OH, by methyl, or by methoxy, or is $C_7$-$C_{10}$-phenylalkyl or cyclohexyl, $R'_2$ is hydrogen, and $R'_3$ is as defined for $R'_1$. Among these compounds are also heterocyclic 2,4-diones, such as N-phenyl-3-acetylpyrrolidine-2,4-dione. The patent EP 0.734.414 A1 describes other representatives of this category. Examples of an amount that can be used of the diketo compounds is from 0.01 to 10 parts by weight, usefully from 0.01 to 3 parts by weight, and in particular from 0.01 to 2 parts by weight, based on 100 parts by weight of PVC.

Antioxidants

Among these are sterically hindered phenols, such as alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ethers, e.g.

2,2'-thiobis(6-tert-butyl-4-methylphenol), alkylidenebisphenols, e.g. 2,2'-methylenebis(6-tert-butyl-4-methylphenol), benzyl compounds, e.g. 3,5,3',5'-tetra-tert-butyl-4,4'-dihydroxydibenzyl ether, hydroxybenzylated malonates, e.g. dioctadecyl 2,2-bis-(3,5-di-tert-butyl-2-hydroxybenzyl)malonate, hydroxybenzylaromatic compounds, e.g. 1,3,5-tris(3, 5-di-tert-butyl-4-hydroxybenzyl)-2,4,6-trimethylbenzene, triazine compounds, e.g. 2,4-bisoctylmercapto-6-(3,5-di-tert-butyl-4-hydroxyanilino)-1,3,5-triazine, phosphonates, and phosphonites, e.g. dimethyl 2,5-di-tert-butyl-4-hydroxybenzylphosphonate, acylaminophenols, e.g. 4-hydroxylauric anilide, esters of beta-(3,5-di-tert-butyl-4-hydroxyphenyl) propionic acid, of beta-(5-tert-butyl-4-hydroxy-3-methylphenyl)propionic acid, of beta-(3,5-dicyclohexyl-4-hydroxyphenyl)propionic acid, esters of 3,5-di-tert-butyl-4-hydroxyphenylacetic acid with mono- or polyhydric alcohols, amides of β-(3,5-di-tert-butyl-4-hydroxyphenyl) propionic acid, e.g. N,N'-bis(3,5-di-tert-butyl-4-hydroxyphenyl-propionyl)hexamethylenediamine, vitamin E (tocopherol), and derivatives, and also D,L-ascorbic acid. Examples of an amount that can be used of the antioxidants is from 0.01 to 10 parts by weight, usefully from 0.1 to 10 parts by weight, and in particular from 0.1 to 5 parts by weight, based on 100 parts by weight of PVC.

UV Absorbers and Light Stabilizers

Examples of these are 2-(2'-hydroxyphenyl)benzotriazoles, e.g. 2-(2'-hydroxy-5'-methylphenyl)benzotriazole, 2-hydroxybenzophenones, esters of optionally substituted benzoic acids, e.g. 4-tert-butyl-phenyl salicylate, phenyl salicylate, acrylates, nickel compounds, oxalamides, e.g. 4,4'-dioctyloxyoxanilide, 2,2'-dioctyloxy-5,5'-di-tert-butyloxanilide, 2-(2-hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines based on tetramethylpiperidine and, respectively, tetramethylpiperazinone, or tetramethylmorpholinone, e.g. bis(2,2,6,6-tetramethylpiperidin-4-yl)sebacate, bis(2,2,6,6-tetramethylpiperidin-4-yl)succinate, and also benzoxazinones, such as 1,4-bisbenzoxazinonylbenzene.

Optical Brighteners

Examples of these are bisbenzene(1,4)oxazoles, phenylcoumarins, and bisstyrylbiphenyls, e.g. 4-methyl-7-diethylaminocoumarin, 3-phenyl-7-(4-methyl-6-butoxybenzoxazole)coumarin, 4,4'-bis(benzoxazol-2-yl)stilbene, and 1,4-bis(benzoxazol-2-yl)naphthalene. Preference is given to solutions of optical brighteners in a plasticizer, such as DOP.

Antistatic Agents

Antistatic agents are divided into nonionic (a), anionic (b), cationic (c), and amphoteric (d) classes. Among (a) are fatty acid ethoxylates, fatty acid esters, ethoxylated fatty alkylamines, fatty acid diethanolamides, and ethoxylated phenols and alcohols, and also monofatty acid esters of polyglycols. Among (b) are the fatty alkanesulfonates of alkali metals and the alkali metal salts of bis(fatty alcohol) esters of phosphoric acid. Among (c) are quaternary fatty alkylammonium salts, and among (d) are fatty alkyl betaines and fatty alkylimidazoline betaines. Individual preferred compounds are lauric diethanolamide, myristyldiethanolamine, Na octadecylsulfonate, and Na bisoctadecyl phosphate.

Biocides

Biocides that may be mentioned are: isothiazolin-3-one derivatives, such as 2-n-octyl-4-isothiazolin-3-one (OIT) and 4,5-dichloro-2-n-octyl-4-isothiazolin-3-one (DCOIT), Ag—Zn zeolite, N-trichloromethylthio-4-cyclohexene-1,2-dicarboximide, 2,3,5,6-tetrachloro-4-(methylsulfonyl)pyridine, 10,10'-oxybisphenoxarsine (OBPA), quaternary ammonium and phosphonium salts, 3-iodo-2-propynyl butylcarbamate (IPBC), methyl benzimidazole-2-carbamate, 2,4,4'-trichloro-2'-hydroxydiphenyl ether, zinc bis-2-pyridinethiolate N-oxide (zinc pyrithione), and 1,2-benzisothiazolin-3-one, N-butylbenzisothiazolin-3-one, and also 2-(4-thiazolyl)benzimidazole (thiabendazole).

Pigments

Pigments are another suitable constituent of the stabilizer system of the invention. The person skilled in the art is aware of suitable substances. Examples of inorganic pigments are $TiO_2$, zirconium-oxide-based pigments, $BaSO_4$, zinc oxide (zinc white), and lithopones (zinc sulfide/barium sulfate), carbon black, carbon-black-titanium-dioxide mixtures, iron oxide pigments, $Sb_2O_3$, $(Ti,Ba,Sb)O_2$, $Cr_2O_3$, spinelles, such as cobalt blue and cobalt green, Cd(S,Se), ultramarine blue. Examples of organic pigments are azo pigments, phthalocyanine pigments, quinacridone pigments, perylene pigments, diketopyrrolopyrrole pigments, and anthraquinone pigments. Preference is given to $TiO_2$, also in micronized form. "Handbook of PVC Formulating", E. J. Wickson, John Wiley & Sons, New York, 1993 gives a definition and further descriptions.

Fillers

Fillers that may be mentioned are: calcium carbonate, dolomite, calcium sulfate, talc, kaolin, mica, feldspar, nepheline, syenite, wollastonite, barium sulfate, heavy spar, aluminum hydroxide, magnesium hydroxide, carbon black, and graphite.

Blowing Agents

Examples of blowing agents are organic azo and hydrazo compounds, tetrazoles, oxazines, isatinic anhydride, N-methylisatinic anhydride, and also soda and sodium bicarbonate. Preference is given to azodicarbonamide and sodium bicarbonate, and also to mixtures of these. Very particular preference is given to isatinic anhydride or N-methylisatinic anhydride, specifically in flexible PVC or semirigid PVC.

Lubricants

A stabilizer system of the invention can also comprise lubricants.

Examples of lubricants that can be used are: montan waxes, fatty acid esters, PE waxes and PP waxes, amide waxes, chloroparaffins, glycerol esters or alkaline-earth-metal soaps, and also fatty ketones, and combinations thereof, as listed in the patent EP 0.259.783 A1.

A stabilizer system of the invention can comprise an amount of up to about 70% by weight, in particular up to about 40% by weight, of the lubricants described.

Plasticizers

Organic plasticizers are also suitable additives for the stabilizer system of the present invention. Examples of organic plasticizers that can be used are those from the following groups:

(i) phthalic esters, preferred examples being di-2-ethylhexyl, diisononyl, and diisodecyl phthalates, which are also known by the familiar abbreviations DOP (dioctyl phthalate, di-2-ethylhexyl phthalate), DINP (diisononyl phthalate), and DIDP (diisodecyl phthalate), (ii) esters of aliphatic dicarboxylic acids, in particular esters of adipic, azelaic, and sebacic acid, preference being given to di-2-ethylhexyl adipate and diisooctyl adipate, (iii) trimellitic esters, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl, and tri-$C_9$-$C_{11}$-alkyl trimellitates; familiar abbreviations are TOTM (trioctyl trimellitate, tri-2-ethylhexyl trimellitate), TIDTM (triisodecyl trimellitate), and TITDTM (triisotridecyl trimellitate), (iv) epoxy plasticizers; these are mainly epoxidized unsaturated fatty acids, e.g. epoxidized soybean oil,
(v) polymeric plasticizers: the most familiar starting materials for producing these are dicarboxylic acids such as adipic, phthalic, azelaic, and sebacic acid, and diols, such as 1,2-propanediol, 1,3-butanediol, 1,4-butanediol, 1,6-hexanediol, neopentyl glycol, and diethylene glycol, (see ADMEX® grades from Velsicol Corp. and PX-811 from Asahi Denka),
(vi) phosphoric esters: a definition of these esters can be found on pages 408-412 in chapter 5.9.5 of "TASCHEN-BUCH der Kunststoffadditive" [Plastics additives handbook]. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, resorcinol bisdiphenyl phosphate, triphenyl phosphate, tricresyl phosphate, and trixylenyl phosphate; preference is given to tri-2-ethylhexyl phosphate and to Reofos® 50 and 95 (see Ciba Spezialitätenchemie),
(vii) chlorinated hydrocarbons (paraffins),
(viii) hydrocarbons,
(ix) monoesters, e.g. butyl oleate, phenoxyethyl oleate, tetrahydrofurfuryl oleate, and alkylsulfonic esters,
(x) glycol esters, e.g. diglycol benzoates,
(xi) citric esters, e.g. tributyl citrate and tributyl acetylcitrate, as described in the patent WO 02/05206,
(xii) perhydrophthalic, -isophthalic, and -terephthalic esters, and also perhydrogenated glycol and diglycol benzoates; preference is given to perhydrogenated diisononyl phthalate (Hexamoll® DINCH—producer: BASF), as described in the patents DE 197.56.913 A1, DE 199.27.977 A1, DE 199.27.978 A1, and DE 199.27.979 A1.
(xiii) Castor-oil-based plasticizers (Soft-N-Safe®, producer: DANISCO),
(xiv) ketone-ethylene-ester terpolymers: Elvaloy® KEE, (Elvaloy® 741, Elvaloy® 742, producer: DuPont).

A definition of these plasticizers and examples of the same are given in pages 412-415 of chapter 5.9.6 of "TASCHEN-BUCH der Kunststoffadditive" [Handbook of plastics additives], R. Gächter/H. Müller, Carl Hanser Verlag, $3^{rd}$ edn., 1989, and also on pages 165-170 of "PVC Technology", W. V. Titow, $4^{th}$. edn., Elsevier Publ., 1984. An example of an amount that can be present of the plasticizers is up to about 99.5% by weight, in particular up to about 30% by weight, up to about 20% by weight, or up to about 10% by weight. For the purposes of one preferred embodiment of the present invention, the lower limit for these plasticizers as constituents of the stabilizer systems of the invention is about 0.1% by weight or more, for example about 0.5% by weight, 1% by weight, 2% by weight, or 5% by weight.

Definitions and examples of other additions, such as impact modifiers and processing aids, gelling agents, biocides, metal deactivators, flame retardants, antifogging agents, and also compatibilizers are described in "Handbuch der Kunststoffadditive" [Plastics additives handbook], R. Gächter/H. Müller, Carl Hanser Verlag, $3^{rd}$ edn., 1989, and also $4^{th}$ edn., 2001, and in "Handbook of Polyvinyl Chloride Formulating" E. J. Wickson, J. Wiley & Sons, 1993, and also in "Plastics Additives" G. Pritchard, Chapman & Hall, London, 1st edn., 1998. Another detailed description of impact modifiers is found in "Impact Modifiers for PVC", J. T. Lutz/ D. L. Dunkelberger, John Wiley & Sons, 1992.

The invention further provides compositions which comprise a chlorine-containing polymer and a stabilizer system of the invention.

The concentration ranges to be used of components (A)+(B) in these compositions, in order to stabilize the chlorine-containing polymer are usefully as follows:

Preferred: (A) from 0.01 to 30 pts. by wt.
(B) from 0.001 to 10 pts. by wt.
Particularly preferred: (A) from 0.05 to 15 pts. by wt.
(B) from 0.01 to 5.0 pts. by wt.
Very particularly preferred: (A) from 0.1 to 10 pts. by wt.
(B) from 0.01 to 3.0 pts. by wt.
based on 100 parts by weight of halogen-containing polymer.

It is moreover preferable that the amount used of the compounds of the formula (A) is from 0.01 to 3.0 phr, preferably from 0.05 to 1.5 phr, and particularly preferably from 0.1 to 1.0 phr.

The concentration ranges that can be used for optionally present component (C) are:
Preferred: 0.01 to 10 pts. by wt.
Particularly preferred 0.01 to 5.0 pts. by wt
Very particularly preferred: 0.1 to 2.0 pts. by wt.
based on 100 parts by weight of halogen-containing polymer.

It is moreover preferable that the amount used of component (C) is from 0.01 to 10 phr, preferably from 0.01 to 5.0 phr, and particularly preferably from 0.01 to 2.0 phr.

The composition of the invention can, of course, also comprise further compounds which have been mentioned above as constituents of the stabilizer system of the invention.

The present application therefore also provides a composition which also comprises at least one of the following compounds: magnesium hydroxide and alkaline-earth-metal soaps, polyols or sugar alcohols, or trishydroxyethyl isocyanurate (THEIC), phosphorous esters, glycidyl compounds, epoxidized fatty acid esters, sterically hindered amines (HALS), antioxidants, UV absorbers and light stabilizers, optical brighteners, antistatic agents, biocides, pigments, fillers, blowing agents, lubricants, plasticizers, impact modifiers, and processing aids.

Examples of the halogen-containing polymers to be stabilized are chlorine-containing polymers, in particular and very particularly preferably those of vinyl chloride, and also of vinylidene chloride, vinyl resins containing vinyl chloride units in their structure, e.g. copolymers of vinyl chloride and vinyl esters of aliphatic acids, in particular vinyl acetate, copolymers of vinyl chloride with esters of acrylic and methacrylic acid and with acrylonitrile, copolymers of vinyl chloride with diene compounds and with unsaturated dicarboxylic acids, or anhydrides of these, e.g. copolymers of vinyl chloride with diethyl maleate, diethyl fumarate, or maleic anhydride, postchlorinated polymers and copolymers of vinyl chloride, copolymers of vinyl chloride and of vinylidene chloride with unsaturated aldehydes and ketones and other compounds, such as acrolein, crotonaldehyde, vinyl methyl ketone, vinyl methyl ether, vinyl isobutyl ether, and the like; polymers of vinylidene chloride, and copolymers of the same with vinyl chloride and with other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, e.g. dichlorostyrene; chloro rubbers; chlorinated polymers of ethylene; polymers and postchlorinated polymers of chlorobutadiene and copolymers of these with vinyl chloride, chlorinated natural and synthetic rubbers, and also mixtures of the above-mentioned polymers, within this group, or with other polymerizable compounds. For the purposes of this invention, the term PVC also covers copolymers of vinyl chloride with polymerizable compounds such as acrylonitrile or vinyl acetate, or ABS, and the materials here can be suspension polymers, bulk polymers, or emulsion polymers.

Preference is given to a PVC homopolymer, also in combination with polyacrylates or with polymethacrylates.

Graft polymers of PVC with EVA, ABS, and MBS can also be used, as also can graft polymers of PVC with PMMA. Other preferred substrates are mixtures of the abovementioned homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM, and with polylactones, in particular from the group of ABS, NBR, NAR, SAN, and EVA. The abbreviations relating to the copolymers are familiar to the person skilled in the art, their meaning being as follows: ABS: acrylonitrile-butadiene-styrene; SAN: styrene-acrylonitrile; NBR: acrylonitrile-butadiene; NAR: acrylonitrile-acrylate; EVA: ethylene-vinyl acetate. A particular other material that can be used is styrene-acrylonitrile copolymers based on acrylate (ASA). A preferred component in this connection is provided by polymer compositions which comprise, as components (i) and (ii), a mixture of from 25 to 75% by weight of PVC and from 75 to 25% by weight of the abovementioned copolymers. A particularly important component is provided by compositions made of (i) 100 parts by weight of PVC and (ii) from 0 to 300 parts by weight of ABS and/or SAN-modified ABS, and from 0 to 80 parts by weight of the copolymers NBR, NAR and/or EVA, but in particular EVA.

The chlorine-containing polymers used for stabilization for the purposes of this invention can also in particular comprise recyclates, these being the polymers described in more detail above which have been degraded by processing, use, or storage. PVC recyclate is particularly preferred. Another use of the stabilizer combinations of the invention consists in the capability to provide antistatic properties to the finished item made of rigid or flexible PVC. It is thus possible to reduce the use of expensive antistatic agents. For this application, preference is given to flexible PVC or semirigid PVC.

The invention further provides articles, such as consumer goods (consumer articles) which comprise a composition of the invention.

Preference is also given to the use of consumer articles which feature a particularly fine foam structure. This applies to rigid, flexible, and semirigid PVC. This aspect is particularly important in wallcoverings and floorcoverings made of flexible PVC. Achievement of a fine foam normally requires kickers which are heavy-metal compounds, e.g. Zn stabilizers or Sn stabilizers. Surprisingly, it has been found that TEAP inner complexes exert a kicker effect on isatinic anhydride or N-methylisatinic anhydride, ensuring that a fine foam structure is achieved.

It is also surprising that the electrical resistance properties of a consumer item which comprises TEA inner complexes of the formula (B) as component are dramatically improved, and this has proven particularly advantageous in the production of cables and insulators and in applications in the semiconductor sector.

These items (mainly cables) moreover have superior water-aging performance, since the formulations comprise no zinc soaps and processing does not therefore produce any zinc chloride which, after migration to the surface of the plastic, impairs electrical properties.

It is also possible that zinc-containing fungicides are added in cases where zinc-sensitive applications have a pressing need for biocidal properties, mainly in the flexible-PVC sector (examples being foils and roof sheeting), the result being severe restriction on the use of calcium-zinc stabilizers.

The compounds that can be used concomitantly, and also the chlorine-containing polymers, are well known to the person skilled in the art and are described in detail in "HANDBUCH DER KUNSTSTOFFADDITIVE" [Plastics additives handbook], R. Gächter/H. Müller, Carl Hanser Verlag, $3^{rd}$ edn., 1989 and $4^{th}$ edn. 2001, in DE 197.41.778 A1, and EP 0.967.245 A1, and those publications are hereby incorporated herein by way of reference.

The stabilizer system of the invention is suitable not only for chlorine-containing polymer compositions which are unplasticized or plasticizer-free or in essence plasticizer-free compositions but also for plasticized compositions. Particular preference is given to applications in rigid PVC or semirigid PVC.

The compositions of the invention are particularly suitable in the form of rigid formulations for hollow bodies (bottles), foils, including packaging foils (thermoforming foils), blown foils, "crashpad" foils (automobiles), and foils in the office sector, pipes, foams, profiles, including heavy-duty profiles (windowframes), luminous-wall profiles, and construction profiles, blister packs (including those produced by the Luvitherm process), sidings, fittings, margarine tubs, packaging for chocolates and housings for apparatus, computer housings, insulators, and constituents of household equipment, and they are also suitable for electronics applications, in particular in the semiconductor sector. They are very particularly suitable for producing window profiles with high whiteness and surface luster.

Preferred other compositions in the form of semirigid and flexible formulations are for wire sheathing, cable insulation, decorative foils, roofing foils, foams, agricultural foils, hoses, gasket profiles, floorcoverings, wallcoverings, motor-vehicle parts, flexible foils, injection moldings (blow molding), foils for the office sector, and foils for air-supported structures. Examples of the use of the compositions of the invention as plastisols are children's products (rotational molding), synthetic leather, floorcoverings, textile coatings, wallcoverings, coil-coating applications, and underbody protection for motor vehicles, and examples of sinter PVC applications of the compositions of the invention are slush, slush mold, and coil-coating applications, and also, in EPVC, for foils produced by the Luvitherm process. For more details in this connection see "KUNSTSTOFFHANDBUCH PVC" [Plastics handbook: PVC], volume 2/2, W. Becker/H. Braun, $2^{nd}$ edn. 1985, Carl Hanser Verlag, pp. 1236-1277.

The present invention further provides the use of a stabilizer system of the invention for stabilizing a halogen-containing polymer, and also the use of a composition of the invention for producing an article of the invention.

EXAMPLES

I. Production of Milled Sheet

Each of the mixtures prepared in tables 1.2 (A-2, B-2), 2.1 (C-2, D-2), 3.1 (E-2, F-2) and 4.1 (G-2, H-2, J-2, K-2), 5.1 (L-2, M-2) and 6.1 (N-2, O-2, P-2, R-2) is plastified at the stated temperature for 5 minutes on a Collin laboratory-roll-mill test system (COLLIN: W100E, BJ: 2005) (roll diameter: 110 mm, 10 rpm, friction: −10%). The resultant foils (thickness 0.3 mm) are passed onward for further testing.

II. Method for Dehydrochlorination Tests (DHC)

DHC is a measure of the HCl elimination that occurs from PVC when it is heated. Distilled water is used to wash the eliminated hydrochloric acid, with nitrogen gas, into a collector, where the rise in conductivity is measured in microsiemens per centimeter (µS/cm). The indices used are the associated values in minutes [min], which are tabulated. The longer the time taken to achieve a certain conductivity, the more heat-resistant the PVC specimen. Equipment: PVC Thermomat 763 (Metrohm)

The tests are carried out to DIN 53381 part 1, method B: conductivity measurement.

Parameter:

Weight of specimen: 500±0.5 mg (chopped milled sheet)

Temperature: ° C. (as stated in the examples)

Flow: 7 l/h (nitrogen 5.0)

Absorption volume: 60 ml (deionized water)

Evaluation: $t_{10}$, $t_{50}$ and $t_{200}$ (conductivity of 10, 50 and 200 μS/cm—data in minute values)

III. Method for Static Heat Test (SHT)

Test strips (15 mm×15 mm) were cut from the milled sheet produced in I. These are heated at the stated temperature in a Heraeus tray oven until significant discoloration occurred. The YI (yellowness index) is then determined to DIN 53381 using Spectro-Guide color-measurement equipment (BYK-GARDNER), and this is compared with the YI of the unheated milled sheet (zero-minute value). The results are tabulated. The smaller the YI at a given juncture, the better the color performance.

IV. Method for Sustained Roll-Milling Test (SRT)

The dynamic heating test (SRT) is carried out on a COLLIN W110E roll mill (roll diameter: 110 mm, 10 rpm, friction: −10%).

The mixtures are homogenized for 5 minutes at the stated temperature on the roll mill. Roll-milling is then continued at this temperature, and test specimens (t=0.3 mm, 25×38 mm) are taken at intervals of 5 minutes, and the yellowing (YI) of these is determined to ASTM D1925, using BYK GARDNER color-measurement equipment (Spectro Guide Sphere Gloss).

Example 1

Flexible PVC, Pigmented Foils

Mixtures A-1 and B-1 are homogenized in a GT universal mixer (ROTH, Karlsruhe) (table 1.1).

TABLE 1.1

Stabilizer mixtures

| Substances | A-1 | B-1 | Comment |
|---|---|---|---|
| DMAU | 18.18 g | 18.18 g | Aminouracil [1] |
| TEAP | 9.09 g | 9.09 g | TEA.NaP [2] |
| SCAV.-A | 72.72 g | — | CAHC [3] |
| SCAV.-B | — | 72.72 g | SORBACID 911 [4] |

[1] 1,3-Dimethyl-6-aminouracil (ex ALDRICH)
[2] Catena-μ-2,2',2"-nitrilotrisethanolperchloratosodium
[3] Ex NABALTEC AG
[4] Ex SÜD-CHEMIE AG (corresponds to Alcamizer 1)

Mixture A-1 is a mixture of the invention. Mixture B-1 corresponds to the prior art (pa). 2.2 g of each of the above-mentioned mixtures are used for the following formulations (table 1.2).

TABLE 1.2

Formulations

| Components | A-2 | B-2 |
|---|---|---|
| PVC (Vinnolit S 4170) K value = 70 | 100 | 100 |
| Plasticizer [5] (Palatinol N) | 50 | 50 |
| Chalk (Omya 95T) | 3 | 3 |
| Titanium dioxide (Kronos 2220) | 3 | 3 |
| Stabilizer mixture (A-1) | 2.2 | — |
| Stabilizer mixture (B-1) | — | 2.2 |

[5] DINP (ex BASF)

The values stated in table 1.3 were measured on the chopped milled sheet produced with formulations A-2 and B-2.

TABLE 1.3

DHC values (190° C.) as in II, milled sheet: 180° C. as in I

| Conductivity [μS/cm] | A-2 [min] | B-2 [min] |
|---|---|---|
| 10 | 122 | 98 |
| 50 | 150 | 103 |
| 200 | 202 | 111 |

The higher the minute values, the better the effect.

The stat. HT was carried out on the test strips produced with formulation A-2 and B-2 (table 1.4).

TABLE 1.4

SHT (180° C.) as in III

| Time [min.] | A-2 [YI] | B-2 [YI] |
|---|---|---|
| 0 | 8.8 | 12.2 |
| 10 | 10.3 | 18.7 |
| 20 | 10.9 | 20.6 |
| 30 | 11.8 | 23.0 |
| 40 | 12.4 | 25.0 |
| 50 | 14.1 | 26.8 |
| 60 | 15.0 | 28.3 |
| 70 | 15.7 | 29.4 |
| 80 | 17.5 | 30.8 |
| 90 | 19.1 | 31.3 |
| 100 | 20.2 | 33.5 |
| 110 | 23.1 | 34.5 |
| 120 | 25.0 | 36.6 |

The smaller the YI and the higher the minute value, the better the performance.

When an identical weight of the stabilizer mixtures is used, a clear and significant improvement is found from dehydrochlorination and from the static heat test, not only in respect of thermal stability (10, 50 and 200 μS/cm values) but also in relation to initial color—IC (from 0 to 20 min) and colorfastness—CF (from 40 to 80 min) and long-term stability—LTS (from 100 to 120 min) for A-2 (comprising CAHC) in comparison with the prior art for B-2 (comprising hydrotalcite).

Example 2

Flexible PVC, Industrial Foils

The following dry powder mixtures were produced (table 2.1).

TABLE 2.1

Formulations

| Components | C-2 | D-2 |
|---|---|---|
| PVC (Vinnolit S 4170) K value = 70 | 100 | 100 |
| Plasticizer [6] (DOP) | 50 | 50 |
| Chalk [7] (Polcarb 50SV) | 20 | 20 |
| Epoxid. soy oil (ESBO) [8] (Lankroflex E2414) | 2.0 | 2.0 |
| Titanium dioxide (Kronos 2220) | 2.0 | 2.0 |
| Antioxidant (BPA) [9] | 0.18 | 0.18 |
| Calcium stearate | 0.2 | 0.2 |
| DMAU [1] | 0.4 | 0.4 |
| TEAP [2] | 0.16 | 0.16 |
| CAHC [3] | 1.6 | — |
| Sorbacid 911 [4] | — | 1.6 |

[7] Ex IMERYS
[8] Ex AKCROS
[9] Bisphenol A: ex ALDRICH

Formulation C-2 is a formulation of the invention. Formulation D-2 corresponds to the prior art. The following DHC values were measured on the resultant formulations C-2 and D-2 (table 2.2).

TABLE 2.2

DHC values (200° C.) as in II, milled sheet: 180° C. as in I

| Conductivity [µS/cm] | C-2 [min] | D-2 [min] |
|---|---|---|
| 10 | 92 | 75 |
| 50 | 141 | 94 |
| 200 | 267 | 170 |

The dehydrochlorination results show that when identical weight of the stabilizer components is used the performance of the formulation comprising CAHC(C-2) is clearly better than that of the formulation comprising hydrotalcite (D-2).

The test strips produced with formulations C-2 and D-2 are tested for color performance (table 2.3).

TABLE 2.3

SHT (200° C.) as in III

| Time [min.] | C-2 [YI] | D-2 [YI] |
|---|---|---|
| 0 | 4.0 | 6.1 |
| 5 | 5.5 | 9.6 |
| 10 | 7.9 | 13.7 |
| 15 | 10.6 | 16.4 |
| 20 | 13.2 | 18.6 |
| 25 | 16.2 | 22.9 |
| 30 | 19.5 | 25.5 |
| 35 | 23.1 | 32.1 |
| 40 | 27.7 | 38.2 |
| 45 | 37.6 | 50.5 |
| 50 | 42.2 | 51.8 |
| 55 | 47.9 | dark brown |

As can be seen from table 2.3, the DHC values for the formulation C-2 comprising CAHC indicate a better color profile than those for the formulation D-2 comprising hydrotalcite in the static heat test.

Example 3

Rigid PVC, Transparent Foils

The following compounded materials E-2 and F-2 were prepared (table 3.1).

TABLE 3.1

Formulations

| Components | E-2 | F-2 |
|---|---|---|
| PVC (Vinnolit S 3160) K value = 60 | 100 | 100 |
| Lubricant [10] (Licolub WE 4 P) | 0.2 | 0.2 |
| Epoxid. soybean oil (ESBO) [8] (Lankroflex E2414) | 3.8 | 3.8 |
| Calcium stearate [11] | 0.25 | 0.25 |
| DMAU [1] | 0.4 | 0.4 |
| TEAP [2] | 0.2 | 0.2 |
| CAHC [3] | 1.6 | — |
| Sorbacid 911 [4] | — | 1.6 |

[10] Ex CLARIANT
[11] Ex PETER-GREVEN Fettchemie

Formulation E-2 is a formulation of the invention. Formulation F-2 corresponds to the prior art. Formulations E-2 and F-2 can be characterized by the following DHC values (table 3.2).

TABLE 3.2

DHC values (180° C.) as in II, milled sheet: 180° C. as in I

| Conductivity [µS/cm] | E-2 [min] | F-2 [min] |
|---|---|---|
| 10 | 245 | 210 |
| 50 | 293 | 217 |
| 200 | 407 | 233 |

The dehydrochlorination data indicate clearly that when the amount used of the stabilizer components is identical the performance of the formulation E-2 comprising CAHC is very much better than that of the formulation F-2 comprising hydrotalcite.

The test strips produced with formulation E-2 and F-2 are subjected to the SHT (table 3.3).

TABLE 3.3

SHT (190° C.) as in III

| Time [min.] | E-2 [YI] | F-2 [YI] |
|---|---|---|
| 0 | 7.7 | 8.8 |
| 10 | 13.1 | 11.2 |
| 20 | 17.8 | 23.6 |
| 30 | 24.1 | 31.6 |
| 40 | 36.8 | 42.9 |
| 50 | 43.4 | 48.7 |
| 60 | 49.1 | 58.5 |
| 70 | 55.2 | 66.5 |
| 80 | 63.9 | 76.9 |
| 90 | 81.7 | 90.5 |
| 100 | 88.7 | 114.8 |
| 110 | 99.7 | 134.6 |
| 120 | 100.3 | 140.6 |

The static heat test likewise indicates convincingly that E-2 is superior to F-2.

Example 4

Rigid PVC, Profile Formulation

The following dry powder mixtures were prepared (table 4.1).

TABLE 4.1

| Components | Formulations | | | |
|---|---|---|---|---|
| | G-2 | H-2 | J-2 | K-2 |
| PVC (Vinnolit S3268) K value = 68 | 94 | 94 | 94 | 94 |
| PVC [12] (Vinnolit K 707) | 12 | 12 | 12 | 12 |
| Chalk (Omya 95T) | 6 | 6 | 6 | 6 |
| Titanium dioxide (Kronos 2220) | 4 | 4 | 4 | 4 |
| Lubricant [13] (LOXIOL G60) | 0.5 | One-Pack I | One-Pack II | One-Pack II |
| Lubricant [13] (LOXIOL G22) | 0.1 | | | |
| DMAU [1] | 0.4 | | | |
| TEAP [2] | 0.16 | | | |
| CACH [3] | 1.6 | | | |
| Antioxidant [14] (Irganox 1076) | 0.15 | | | |
| Σ | 2.91 | 3.6 | 3.6 | 3.6 |
| Dipentaerythritol [15] | 0.4 | — | 0.25 | 0.35 |
| Dihydropyridine [16] (Stavinor D 507) | — | — | 0.25 | 0.4 |
| Zinc laurate [11] | — | — | — | 0.3 |
| Σ | 3.31 | 3.6 | 4.1 | 4.65 |

[12] Polyacrylate-based impact modifier
[13] Ex COGNIS
[14] Ex CSC
[15] Ex PERSTORP
[16] Ex ARKEMA Formulation G-2 is a formulation of the invention. Formulations H-2 and, respectively, J-2 and K-2 correspond to the published and, respectively, unpublished prior art.

The milled sheet derived from the formulations G-2, H-2, J-2, and K-2 was characterized as follows by way of its DHC values (table 4.2).

TABLE 4.2

DHC values (190° C.) as in II, milled sheet: 195° C., as in I

| Conductivity [μS/cm] | G-2 [min] | H-2 [min] | J-2 [min] | K-2 [min] |
|---|---|---|---|---|
| 10 | 79 | 71 | 69 | 73 |
| 50 | 97 | 77 | 75 | 78 |
| 200 | 131 | 90 | 88 | 92 |

G-2 is a formulation of the invention. H-2, J-2, and K-2 are prior art. H-2 is a Ca/Zn-stabilizer composition obtainable commercially (One-Pack I), and was used at the recommended guideline concentration of 3.6 phr. One-Pack II is the same as One-Pack I except that instead of Alkamizer P93 identical content by weight of CAHC has been used.

The dehydrochlorination results show that G-2 (CAHC in a formulation free from heavy metal) is superior to the commercial product H-2 comprising heavy metal, with a marked reduction in amount used (3.31 in comparison with 3.6 phr).

Similar considerations apply to the formulations J-2 and K-2, which comprise CAHC in combination with calcium-zinc soaps comprising heavy metal, and the effect of which was optimized by further addition of dipentaerythritol, dihydropyridine, and zinc laurate. Again, this comparison uses increased total concentrations (4.1 and 4.65 phr in comparison with 3.31 phr).

The results from testing of the formulations G-2, H-2, J-2, and K-2 in the sustained roll-milling test was as follows (table 4.3).

TABLE 4.3

SRT (195° C.) as in IV

| Time [min] | G-2 [YI] | H-2 [YI] | J-2 [YI] | K-2 [YI] |
|---|---|---|---|---|
| 5 | 9.3 | 9.9 | 8.7 | 8.6 |
| 10 | 11.5 | 11.0 | 10.6 | 10.7 |
| 15 | 13.4 | 12.5 | 12.9 | 14.0 |
| 20 | 16.4 | 18.4 | 18.1 | 17.1 |
| 25 | 19.2 | 22.6 | 26.8 | 21.5 |
| 30 | 23.5 | 26.1 | 34.0 | 29.8 |
| 35 | 27.8 | 31.0 | 36.7 | 34.7 |
| 40 | 31.3 | 35.3 | 40.1 | 36.1 |
| 45 | 44.4 | 37.1 | 41.6 | 36.5 |
| 50 | 47.2 | 47.3 | 50.1 | 38.1 |
| 55 | 48.5 | 52.0 | 55.7 | 41.7 |
| 60 | 49.3 | — | — | 48.8 |

Here again, comparison of G-2 with H-2 in the window-profile formulation, using approximately identical weight (3.31 compared with 3.6 phr), indicates that G-2 is superior in respect of IC, CF, and LTS (i.e. across the entire color profile).

Example 5

Rigid PVC, Foil Formulation

The following dry powder mixtures (dryblends) were prepared (table 5.1).

TABLE 5.1

| Components | Formulations | |
|---|---|---|
| | L-2 | M-2 |
| PVC (Vinnolit S3160) K value = 60 | 100 | 100 |
| Lubricant [10] (Licolub WE 4 P) | 0.2 | 0.2 |
| ESBO [8] (Lankroflex E 2414) | 3.0 | 3.0 |
| Calcium stearate [11] | 0.2 | 0.2 |
| Dihydropyridine [15] (Stavinor D 507) | 0.4 | 0.4 |
| TEAP [2] | 0.16 | 0.16 |
| CAHC [3] | 1.0 | — |
| Sorbacid 911 [4] | — | 1.0 |

Formulation L-2 is a formulation of the invention, and formulation M-2 corresponds to the prior art. Both formulations comprise DHP to improve IC and can therefore be compared directly with example 3, which includes DMAU to improve IC.

The DHC values of the formulations are as follows (table 5.2).

TABLE 5.2

DHC values (190° C.) as in II, milled sheet: 180° C. as in I

| Conductivity [μS/cm] | L-2 [min] | M-2 [min] |
|---|---|---|
| 10 | 92 | 79 |
| 50 | 112 | 97 |
| 200 | 158 | 131 |

These data provide a very good indication of the superiority of L-2 over M-2.

The SRT on formulations L-2 and M-2 gave the following result (table 5.3).

TABLE 5.3

| | SRT (180° C.) as in IV | |
|---|---|---|
| Time [min] | L-2 [YI] | M-2 [YI] |
| 5 | 6.9 | 23.0 |
| 10 | 8.5 | 41.7 |
| 15 | 10.8 | 53.6 |
| 20 | 14.2 | 67.1 |
| 25 | 21.5 | 70.8 |
| 30 | 33.1 | 79.6 |
| 35 | 48.5 | dark brown |
| 40 | 55.4 | |
| 45 | 60.1 | |
| 50 | 64.6 | |
| 55 | 67.2 | |
| 60 | 73.4 | |
| 65 | dark brown | |

The values suggest that the formulation L-2 of the invention is significantly superior to the formulation M-2 corresponding to the prior art, and not only in respect of IC, CF, and LTS: a surprising result in the SRT here is the severe fall-off in the effect of M-2 in comparison with example 3, which indicates the effect of Sorbacid 911 (F-2) in the SHT.

Example 6

Flexible PVC, Cable Formulation

The following dryblends were produced (table 6.1).

TABLE 6.1

| | Formulations | | | |
|---|---|---|---|---|
| Components | N-2 | O-2 | P-2 | R-2 |
| PVC (Vinnolit S4170) K value = 70 | 100 | 100 | 100 | 100 |
| Plasticizer [5)] (Palatinol N) | 50 | 50 | 50 | 50 |
| Chalk [7)] (Polcarb 50 SV) | 50 | 50 | 50 | 50 |
| Irganox 1010 [16)] | 0.43 | 0.43 | 0.43 | 0.43 |
| Calcium stearate [11)] | 0.79 | 0.79 | 0.79 | 0.79 |
| DMAU [1)] | 0.2 | 0.2 | 0.2 | 0.2 |
| TEAP [2)] | 0.1 | 0.1 | 0.1 | 0.1 |
| CAHC [3)] | 2.58 | — | — | — |
| Alcamizer P93 [17)] | — | 2.58 | — | — |
| Sorbacid 911 [4)] | — | — | 2.58 | — |
| Calcium hydroxide (Nekapur 2) [18)] | — | — | — | 2.58 |

[16)] Antioxidant ex CSC;
[17)] Hydrotalcite ex KYOWA (Alkamizer 4);
[18)] Ex Kalkfabrik Netstal AG Formulation N-2 is a formulation of the invention, and O-2, P-2, and R-2 are found in the prior art. O-2 and P-2 can be considered to be the closest prior art. The DHC values for formulations N-2, O-2, and P-2 are as follows (table 6.2).

TABLE 6.2

| | DHC values (200° C.) as in II, milled sheet: 190° C. as in I | | |
|---|---|---|---|
| Conductivity [µS/cm] | N-2 [min] | O-2 [min] | P-2 [min] |
| 10 | 147 | 113 | 93 |
| 50 | 224 | 134 | 130 |
| 200 | 354 | 173 | 232 |

Comparison of O-2 and P-2 with N-2 reveals a loss of quality (minute values becoming smaller).

The result of the SRT on formulations N-2, O-2, and P-2 was as follows (table 6.3) (with the prior art also extended to cover R-2).

TABLE 6.3

| | SRT (190° C.) as in IV | | | |
|---|---|---|---|---|
| Time [min] | N-2 [YI] | O-2 [YI] | P-2 [YI] | R-2 [YI] |
| 10 | 30.9 | 31.6 | 39.0 | 33.2 |
| 20 | 33.6 | 36.4 | 50.1 | 39.4 |
| 30 | 37.8 | 42.0 | 59.4 | 45.0 |
| 40 | 42.7 | 47.2 | 71.3 | 49.7 |
| 50 | 46.6 | 55.1 | 84.7 | 55.5 |
| 60 | 52.2 | 59.0 | 97.8 | 61.2 |
| 70 | 56.3 | 67.2 | 107.7 | 67.5 |
| 80 | 63.7 | 76.0 | 108.2 | 72.8 |
| 90 | 69.3 | 85.4 | dark brown | 79.5 |
| 100 | 75.3 | 92.8 | | 86.2 |
| 110 | 80.8 | 99.0 | | 86.3 |
| 120 | 82.3 | 99.4 | | 86.8 |
| 130 | 83.2 | dark brown | | 86.9 |
| 140 | 84.3 | | | 87.8 |

As can be seen, the combination N-2 of the invention is more effective in respect of IC, CF, and LTS in the SRT, in comparison with the closest prior art of O-2 and P-2, and also in comparison with the more distant prior art of R-2.

What is claimed is:

1. A stabilizer system for halogen-containing polymers, comprising, as component (A), calcium monocarbonatohydroxodialuminate of the formula (A)

$$Ca_mAl_2(OH)_{6+2(m-1)}CO_3 \cdot nH_2O \quad (A),$$

where m=from 3.8 to 4.2, and n=from 0 to 3, and,
as component (B), a catena-2,2',2"-nitrilotrisethanolperchloratolithium or -sodium coordination polymer (B1) having a monomer unit of the formula

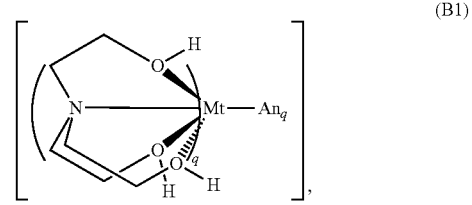

(B1)

where Mt=Li or Na, An=OClO$_3$, and q=1, and/or a quaternary or ternary ammonium or phosphonium perchlorate (B2).

2. The stabilizer system as claimed in claim 1, characterized in that (A) is tetracalcium monocarbonatododecahydroxodialuminate (hydrate).

3. The stabilizer system as claimed in claim 1, characterized in that (B1) is catena-2,2',2"-nitrilotrisethanolperchloratosodium.

4. The stabilizer system as claimed in claim 1, characterized in that (B2) is a perchlorate of the formula $R^1R^2_3XClO_4$, where X is P or N, $R^1$ is H or $R^2$, and each $R^2$, independently of the other, is a saturated or unsaturated, branched or unbranched cyclic or acyclic, or both cyclic and acyclic, hydrocarbon radical having from 1 to 20 carbon atoms.

5. The stabilizer system as claimed in claim 1, characterized in that it also comprises, as component (C), at least one of the compounds selected from the group consisting of a substituted cyanoacetylurea, a substituted 6-aminouracil, a substituted 1,4-dihydropyridine, a 3-aminocrotonic ester, and calcium hydroxide.

6. The stabilizer system as claimed in claim 5, characterized in that the substituted cyanoacetylurea is 1,3-dimethylcyanoacetylurea, the substituted 6-aminouracil is 1,3-dimethyl-6-aminouracil, 1,3-diallyl-6-aminouracil, or a 5,5'-[C$_4$-C$_{18}$-alkylidene]-bis-1,3-dimethyl-6-aminouracil, the substituted 1,4-dihydropyridine is 2,6-dimethyl-3,5-biscarboxylauryl-1,4-dihydropyridine, and the 3-aminocrotonic ester is 1,4-butanediyl bis-3-aminocrotonate or 2,2"-thiobisethanediyl 3-aminocrotonate.

7. The stabilizer system as claimed in claim 1, characterized in that the proportion of component (B), based on component (A), is from 1 to 10% by weight.

8. A composition comprising a halogen-containing polymer and a stabilizer system as claimed in claim 1.

9. The composition as claimed in claim 8, characterized in that the amount used of the compound of the formula (A) is from 0.01 to 3.0 phr, preferably from 0.05 to 1.5 phr, and particularly preferably from 0.1 to 1.0 phr.

10. The composition as claimed in claim 8, characterized in that the amount used of component (C) is from 0.10 to 10 phr, preferably from 0.01 to 5.0 phr, and particularly preferably from 0.01 to 2.0 phr: wherein component (C) is at least one of the compounds selected from the group consisting of a substituted cyanoacetylurea, a substituted 6-aminouracil, a substituted 1 4-dihydropyridine a 3-aminocrotonic ester, and calcium hydroxide.

11. The composition as claimed in claim 8, characterized in that it also comprises at least one of the following compounds: magnesium hydroxide and alkaline-earth-metal soaps, polyols or sugar alcohols or trishydroxyethyl isocyanurate (THEIC), phosphorous esters, glycidyl compounds, epoxidized fatty acid esters, sterically hindered amines (HALS), antioxidants, UV absorbers and light stabilizers, optical brighteners, antistatic agents, biocides, pigments, fillers, blowing agents, lubricants, plasticizers, impact modifiers, and processing aids.

12. The composition as claimed in claim 8, characterized in that the halogen-containing polymer is a chlorine-containing polymer, in particular PVC.

13. An article comprising the composition as claimed in claim 8.

14. The article as claimed in claim 13, characterized in that it is a wood-plastic-composite material (WPC=wood-plastic composite), a foil, a profile, a floorcovering, a motor-vehicle part, a wallcovering, a hose, an injection molding, or wire sheathing.

15. A method of using a stabilizer system as claimed in claim 1 for the stabilization of a halogen-containing polymer comprising incorporating said stabilizer system into a halogen-containing polymer.

16. A method of using a composition as claimed in claim 8 for the production of an article, wherein said article comprises said composition; said method comprises forming an article comprising said composition.

* * * * *